United States Patent
Tsuzuki

(10) Patent No.: US 7,365,520 B2
(45) Date of Patent: Apr. 29, 2008

(54) VEHICLE-GENERATOR OUTPUT VOLTAGE CONTROL APPARATUS

(75) Inventor: Tomomi Tsuzuki, Toyota (JP)

(73) Assignee: Denso Corporation, Kariya (JP)

( * ) Notice: Subject to any disclaimer, the term of this patent is extended or adjusted under 35 U.S.C. 154(b) by 8 days.

(21) Appl. No.: 11/590,806

(22) Filed: Nov. 1, 2006

(65) Prior Publication Data

US 2007/0096698 A1 May 3, 2007

(30) Foreign Application Priority Data

Nov. 2, 2005 (JP) ............................. 2005-319165

(51) Int. Cl.
*H02P 9/04* (2006.01)
*H02P 9/30* (2006.01)
*H02P 11/00* (2006.01)
*H02J 7/14* (2006.01)

(52) U.S. Cl. .............................. 322/28; 322/24; 322/36
(58) Field of Classification Search .................. 322/24, 322/28, 36
See application file for complete search history.

(56) References Cited

U.S. PATENT DOCUMENTS

| | | | | |
|---|---|---|---|---|
| 4,672,297 A | | 6/1987 | Gotoh et al. .................. 322/28 |
| 4,973,896 A | * | 11/1990 | Shiga et al. .................. 322/28 |
| 5,105,143 A | * | 4/1992 | Marumoto et al. ........... 322/28 |
| 5,140,253 A | * | 8/1992 | Itoh ............................. 322/28 |
| 5,144,220 A | | 9/1992 | Iwatani et al. ................ 322/28 |
| 5,157,321 A | * | 10/1992 | Kato et al. .................... 322/28 |
| 5,629,606 A | * | 5/1997 | Asada ........................... 322/28 |
| 5,719,485 A | * | 2/1998 | Asada ........................... 322/28 |
| 5,990,666 A | * | 11/1999 | Sekiya et al. ................ 320/162 |
| 6,734,653 B2 | * | 5/2004 | Taniguchi et al. ............ 322/24 |
| 6,756,770 B2 | * | 6/2004 | Watanabe et al. ............. 322/28 |
| 6,936,996 B2 | * | 8/2005 | Uematsu et al. .............. 322/99 |
| 7,075,272 B2 | * | 7/2006 | Sasaki et al. ................. 322/28 |
| 7,098,628 B2 | * | 8/2006 | Maehara et al. .............. 322/24 |
| 7,235,952 B2 | * | 6/2007 | Maehara ....................... 322/24 |
| 7,294,991 B2 | * | 11/2007 | Kimura et al. ................ 322/37 |
| 2003/0062877 A1 | * | 4/2003 | Watanabe et al. ............. 322/28 |
| 2005/0134237 A1 | * | 6/2005 | Sasaki et al. ................. 322/36 |
| 2005/0140342 A1 | * | 6/2005 | Maehara et al. .............. 322/36 |
| 2007/0267997 A1 | * | 11/2007 | Kanazawa et al. .......... 320/108 |

FOREIGN PATENT DOCUMENTS

| | | |
|---|---|---|
| JP | Y2 6-19359 | 12/1985 |
| JP | A 3-173325 | 7/1991 |

* cited by examiner

*Primary Examiner*—Julio Gonzalez
*Assistant Examiner*—Pedro J. Cuevas
(74) *Attorney, Agent, or Firm*—Oliff & Berridge, PLC

(57) ABSTRACT

The vehicle-generator output voltage control apparatus includes a voltage control circuit regulating an output voltage of a vehicle generator by controlling a field current flowing into a field winding of the vehicle generator by controlling a conduction state of a switching transistor series-connected to the field winding, a power-generation-state signal output circuit outputting a power-generation-state signal through a transmitting/receiving terminal by changing a voltage at the transmitting/receiving terminal in accordance with conduction state of the switching transistor, and a power generation stop circuit stopping power generating operation of the vehicle generator by causing the voltage control circuit to turn off the switching transistor upon detecting a change of the voltage at the transmitting/receiving terminal caused by a power generation stop signal transmitted from an external control device and received at the transmitting/receiving terminal.

7 Claims, 2 Drawing Sheets

VEHICLE-GENERATOR OUTPUT VOLTAGE CONTROL APPARATUS

CROSS-REFERENCE TO RELATED APPLICATION

This application is related to Japanese Patent Application No. 2005-319165 filed on Nov. 2, 2005, the contents of which are hereby incorporated by reference.

BACKGROUND OF THE INVENTION

1. Field of the Invention

The present invention relates to a vehicle-generator output voltage control apparatus for regulating an output voltage of a generator mounted on a vehicle such as a passenger car or a truck.

2. Description of Related Art

There is known a vehicle-generator output voltage control apparatus having a signal output terminal (generally called an FR-terminal) for outputting a signal indicative of a power generation state of a vehicle generator, as disclosed, for example, in Japanese Utility Model Publication No. 6-19359. To perform an output voltage control, this vehicle-generator output voltage control apparatus uses a pulse-like voltage signal appearing at one end of a field coil of a vehicle generator and inputted therein through an F-terminal which is one of its signal input terminals.

Also, there is known a vehicle-generator output voltage control apparatus having a function of changing an output voltage of a vehicle generator between two different levels, as disclosed, for example, in Japanese Patent Application Laid-open No. 3-173325. This vehicle-generator output voltage control apparatus is configured to set the output voltage of the vehicle generator at a low level at the time of starting a vehicle engine, as a result of which the vehicle generator stops its power generating operation. This makes it possible to reduce the power generation torque of the vehicle generator, to thereby stabilize an engine rotational speed during an engine starting period.

Incidentally, there is a need to provide a vehicle-generator output voltage control apparatus such as disclosed in Japanese Utility Model Publication No. 6-19359 with the function as disclosed in Japanese Patent Application Laid-open No. 3-173325. However, to meet this need, it is necessary to additionally provide such a vehicle-generator output voltage control apparatus with a terminal for receiving a power generation stop command from outside, and a cable to be connected to this terminal. Since this requires significant design changes of the vehicle-generator output voltage control apparatus and the vehicle generator, their production costs increase, and their sizes also increase.

SUMMARY OF THE INVENTION

The present invention provides a vehicle-generator output voltage control apparatus comprising:

a voltage control circuit regulating an output voltage of a vehicle generator by controlling a field current flowing into a field winding of the vehicle generator by controlling a conduction state of a switching transistor series-connected to the field winding;

a power-generation-state signal output circuit outputting a power-generation-state signal through a transmitting/receiving terminal by changing a voltage at the transmitting/receiving terminal in accordance with conduction state of the switching transistor; and a power generation stop circuit stopping power generating operation of the vehicle generator by causing the voltage control circuit to turn off the switching transistor upon detecting a change of the voltage at the transmitting/receiving terminal caused by a power generation stop signal transmitted from an external control device and received at the transmitting/receiving terminal.

The vehicle-generator output voltage control apparatus of the present invention is configured to perform transmission of the power-generation-state signal and reception of the power generation stop signal by use of the common transmitting/receiving terminal (FR-terminal). Accordingly, the vehicle-generator output voltage control apparatus of the present invention can have less terminals, smaller size and smaller production cost, compared to the conventional apparatus in which the transmission of the power-generation-state signal and reception of the power generation stop signal are performed by use of two different terminals.

The power generation stop circuit may include a voltage detecting circuit configured to detect the change of the voltage at the transmitting/receiving terminal by comparing the voltage at the transmitting/receiving terminal with a predetermined judging voltage, and to transmit a result of the detection to the voltage control circuit. The power generation stop circuit may periodically reset the result of the detection.

The power-generation-state signal output circuit may have a resistor which is connected to the transmitting/receiving terminal at one end thereof, and is configured to change a voltage of the other end of the resistor to thereby output the power-generation-state signal through the transmitting/receiving terminal. The power-generation-state signal output circuit may have a transistor which is connected between the other end of the resistor and a ground at a collector and an emitter thereof, and operates in synchronization with the switching transistor.

The vehicle-generator output voltage control apparatus may further comprise an abnormality detecting circuit detecting abnormality in the transmitting/receiving terminal, and invalidating the power generation stop signal upon detecting abnormality in the transmitting/receiving terminal.

The vehicle-generator output voltage control apparatus may further comprise a low-voltage detecting circuit detecting a drop below a certain value in the output voltage of the vehicle generator or a terminal voltage of an external battery charged by the vehicle generator, and invalidating the power generation stop signal upon detecting the drop.

Other advantages and features of the invention will become apparent from the following description including the drawings and claims.

PREFERRED EMBODIMENTS OF THE INVENTION

First Embodiment

Figure 1:
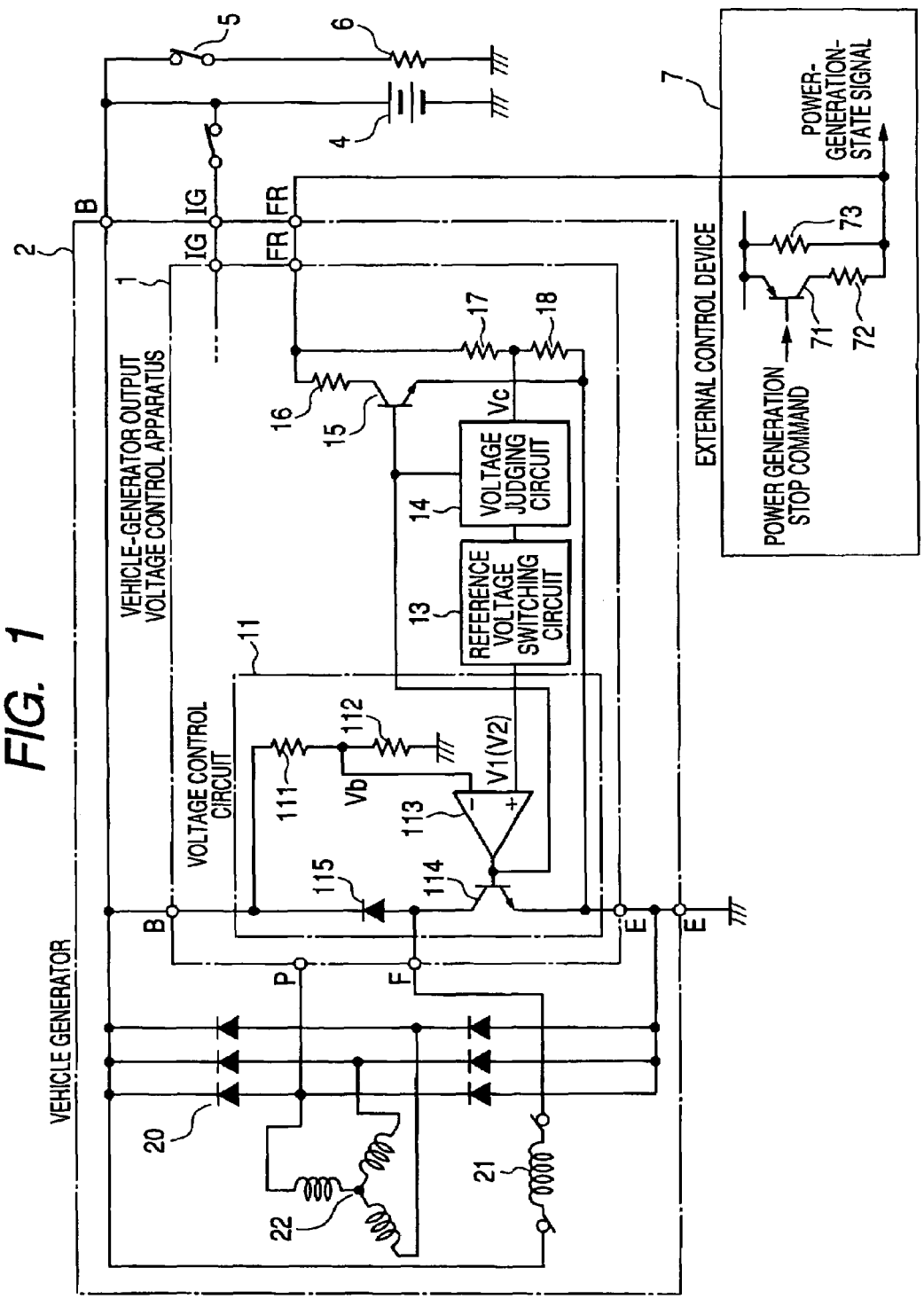
FIG. 1 is a diagram showing an electrical structure of a vehicle generator including a vehicle-generator output voltage control apparatus according to a first embodiment of the invention.

FIG. 1 is a diagram showing an electrical structure of a vehicle generator 2 including a vehicle-generator output voltage control apparatus 1 according to a first embodiment of the invention. As shown in this figure, the vehicle generator 2 includes an armature winding (stator winding) 22, a field winding 21, a rectifier 20, and the vehicle-generator output voltage control apparatus 1. The vehicle generator 2 is belt-driven by a vehicle engine (not shown).

The field winding 21, which is wound around magnetic poles (not shown) mounted to a rotor (not shown), generates a magnetic field when supplied with a field current. The armature winding 22, which is a multiphase winding (three-phase winding in this embodiment), is wound around an armature core (not shown). A three-phase voltage induced across the armature winding 22 by the action of the rotating magnetic field generated by the field winding 21 is full-wave rectified by the rectifier 20. The output voltage of the rectifier 20 is supplied as an output voltage of the vehicle generator 2 to a battery 4, and to an electrical load 6 through a load switch 5. The output voltage of the vehicle generator 2, which varies depending on a rotational speed of the rotor, and the field current flowing into the field winding 21, is regulated by the vehicle-generator output voltage control apparatus 1.

The vehicle-generator output voltage control apparatus 1 is connected to an external control device 7 which includes a transmitting/receiving circuit for transmitting a power generation stop signal to the vehicle-generator output voltage control apparatus 1 and receiving a power-generation-state signal transmitted from this vehicle-generator output voltage control apparatus 1. The transmitting/receiving circuit is constituted by a transistor 71, and resistors 72, 73. The transistor 71, which is connected to a power supply line at its emitter and connected to one end of the resistor 72 at its collector, receives the power generation stop command transmitted from outside at its base. The resistor 73, which serves as a pull-up resistor, is connected to the power supply line at one end, and to the other end of the resistor 72 at the other end. The transistor 71 is turned on when it receives a low-level signal as the power generation stop command at its base. As a result, the one end of the resistor 72 is connected to the power supply line through an emitter-collector path of the transistor 71. The voltage appearing at the other end of the resistor 72 in this state is transmitted from the external control device 7 to the vehicle-generator output voltage control apparatus 1 as the power generation stop signal. On the other hand, the power-generation-state signal transmitted from the vehicle-generator output voltage control apparatus 1 is applied to the other end of the resistor 73. A logical state (high level or low level) of the power-generation-state signal is detected on the basis of the voltage appearing at the other end of the resistor 73.

Next, details of the vehicle-generator output voltage control apparatus 1 are explained.

The vehicle-generator output voltage control apparatus 1 includes a voltage control circuit 11, a reference voltage switching circuit 13, a voltage judging circuit 14, a transistor 15, and resistors 16, 17, 18. The reference voltage switching circuit 13, voltage judging circuit 14, and resistors 17, 18 constitute a power generation stop circuit. The transistor 15 and resistor 16 constitute a power-generation-state signal output circuit.

The voltage control circuit 11 is constituted by resistors 111, 112, a voltage comparator 113, a switching transistor 114, and a fly-wheel diode 115. The voltage comparator 113 receives one of two different reference voltages V1, V2 at its positive terminal, and receives a detection voltage Vb equal to the output voltage (may be referred to as "B-terminal voltage" hereinafter) of the vehicle generator 2 divided down by a voltage dividing circuit constituted by the resistors 111, 112 at its negative terminal. Instead of the B-terminal voltage divided down by the voltage dividing circuit, a terminal voltage of the battery 4 divided down by the voltage dividing circuit may be applied to the negative terminal of the voltage comparator 113. An output signal of the voltage comparator 113 is supplied to the switching transistor 114. The switching transistor 114 is connected to the output terminal of the voltage comparator 113 at its base, to the output terminal (B-terminal) of the vehicle generator 2 through the fly-wheel diode 115 at its collector, and to a ground terminal (E-terminal) at its emitter. The collector of the switching transistor 114 is also connected to the field winding 21 through an F-terminal. When the switching transistor 114 is turned on, the field current flows into the field winding 21, and when the switching transistor 114 is turned off, the passage of the field current is blocked. The fly-wheel diode, which is parallel-connected to the field winding 21, suppresses a surge current due to a voltage induced across the field winding 21 when the switching transistor 114 is turned off.

The reference voltage switching circuit 13, which has a function of generating the two different reference voltages V1, V2 corresponding to two different target regulation voltages, applies one of the two different reference voltages V1, V2 selected in accordance with a judging result by the voltage judging circuit 14 to the positive terminal of the voltage comparator 113. The voltage judging circuit 14 receives a detection voltage Vc equal to the voltage at an FR-terminal (may be referred to as "FR-terminal voltage" hereinafter) divided down by a voltage dividing circuit constituted by the resistors 17, 18, and compares this detection voltage with a predetermined judging voltage. This judging voltage is changed depending on the conduction state (on/off state) of the switching transistor 114. When the detection voltage Vc equal to the FR-terminal voltage divided down by the voltage dividing circuit constituted by the resistors 17, 18 is lower than the judging voltage, the voltage judging circuit 14 outputs a low-level signal as the judging result. On the other hand, when the detection voltage Vc is equal to or higher than the judging voltage, the voltage judging circuit 14 outputs a high-level signal as the judging result. The reference voltage switching circuit 13 outputs the reference voltage V1 when it receives the low-level signal from the voltage judging circuit 14, and outputs the reference voltage V2 when it receives the high-level signal from the voltage judging circuit 14. The reference voltage V2, which is set lower than the reference voltage V1, has such a value as to stop the power generating operation of the vehicle generator 2.

The transistor 15 serves as a switching transistor operating in synchronization with the switching transistor 114 of the voltage control circuit 11. In this embodiment, the transistor 15 is turned on and off in the same timing with respect to the switching transistor 114. The transistor 15 is connected to the output terminal of the voltage comparator 113 of the voltage control circuit 11 at its base, connected to the E-terminal at its emitter, and connected to the FR-terminal through the resistor 16 at its collector. The transistor 15 is turned on when the output signal of the voltage comparator 113 is at high level. At this time, a series circuit of the resistors 17, 18 and a series circuit of the emitter-collector path and the resistor 16 are connected in parallel between the FR-terminal and the E-terminal. On the other hand, the transistor 15 is turned off when the output signal of the voltage comparator 113 is at low level. At this time, only the series circuit of the resistors 17, 18 is connected between the FR-terminal and the E-terminal. Since the voltage at the FR terminal when both the series circuit of the resistors 17, 18 and the series circuit of the emitter-collector path and the resistor 16 are connected in parallel between the FR-terminal and the E-terminal is different from that when only the series circuit of the resistors 17, 18 is connected between the FR-terminal and the E-terminal, it is possible to transmit the voltage at the FR-terminal to the external control device 7 as the power-generation-state signal.

As explained above, the vehicle-generator output voltage control apparatus of this embodiment is provided with the FR-terminal serving as a transmitting/receiving terminal between which and the E-terminal the transistor 15 operating in synchronization with the switching transistor 114 is connected through the resistor 16. By the provision of the transistor 15 which turns on and off at the same timing at which the switching transistor 114 is turned on and off, it becomes possible to transmit the power-generation-state signal indicative of the field current supply state in the field winding 21 (power generation state of the vehicle generator 2) from the FR-terminal to the external control device 7. The external control device 7 detects the voltage appearing at the other end of the resistor 73 connected to the FR-terminal as the power-generation-state signal.

The external control device 7 also transmits, as the power generation stop signal, the voltage of the other end of the resistor 72 to the vehicle-generator output signal control apparatus 1 by turning on the transistor 71 in response to the power generation stop command. This power generation stop signal is inputted to the FR-terminal of the vehicle-generator output control apparatus 1, and supplied to the voltage judging circuit 14 through the voltage dividing circuit constituted by the resistors 17, 18. Since the FR-terminal doubles as the output terminal of the power-generation-state signal, the voltage of the FR-terminal changes depending on the conduction state of the transistor 15 operating to transmit the power-generation-state signal. Accordingly, the voltage judging circuit 14 has two different judging voltages. More specifically, the voltage judging circuit 14 uses, as a first judging voltage, a threshold voltage between the voltage appearing at the FR-terminal when the transistor 71 of the external control device 7 is turned on and the voltage appearing at the FR-terminal when the transistor 71 is turned off in the case of the transistor 15 being in the on state. And the voltage judging circuit 14 uses, as a second judging voltage, a threshold voltage between the voltage appearing at the FR-terminal when the transistor 71 is turned on and the voltage appearing at the FR-terminal when the transistor 71 is turned off in the case of the transistor 15 being in the off state. The voltage judging circuit 14 selects one of the first and second judging voltages depending on the conduction state of the transistor 15, and compares the detection voltage Vc equal to the FR-terminal voltage divided down by the voltage dividing circuit constituted by the resistors 17, 18 with the selected judging voltage. When the detection voltage Vc is higher than the selected judging voltage, that is when the power generation stop signal is inputted from the external control device 7 to the FR-terminal, the voltage judging circuit 14 output a high-level signal as the judging result. The reference voltage switching circuit 13 generates the lower reference voltage V2 when it receives the high-level signal from the voltage judging circuit 14. The voltage control circuit 11 performs the output voltage control of the vehicle generator 2 by use of this reference voltage V2, as a result of which the power generating operation by the vehicle generator 2 is stopped.

By performing transmission of the power-generation-state signal and reception of the power generation stop signal by use of the common FR-terminal, it becomes possible to reduce the number of the terminals to be provided in the vehicle-generator output voltage control apparatus 1, and accordingly to reduce its size and production cost, compared to a case where the transmission of the power-generation-state signal and reception of the power generation stop signal are performed by use of two different terminals.

The voltage judging circuit 14 performing comparison between the FR-terminal voltage divided down by the voltage dividing circuit constituted by the resistors 17, 18 and the judging voltage, selects one of the two different threshold voltages depending on the conduction state of the transistor 15 as the judging voltage. The voltage level of the power-generation-state signal changes depending on the conduction state of the transistor 15, and the voltage appearing at the FR-terminal changes with the change of the voltage level of the power-generation-state signal. Accordingly, by switching the judging voltage between the two different threshold voltages depending on the conduction state of the transistor 15, it becomes possible to accurately judge whether or not the power generation stop signal has been received. In addition, it makes possible to judge the reception of the power generation stop signal both when the transistor 15 is in the on state and when the transistor 15 is in the off state.

The provision of the resistor 16 connected between the FR-terminal and the transistor 15 makes it possible to prevent the transistor 15 from being damaged when the FR-terminal is directly connected to the battery 4 by mistake.

It is a matter of course that various modifications can be made to the above described embodiment as described below. Although the power-generation-state signal is transmitted from the FR-terminal by use of the transistor 15 which is turned and off at the same timing with respect to the switching transistor 114 in the above described embodiment, it may be transmitted by use of a transistor which is turned on and off at the opposite timing with respect to the switching transistor 114. The resistor 16 connected between the transistor 15 and the FR-terminal may be removed in a case where it is unnecessary. A resistor may be connected to the collector of the switching transistor 114 to be used as a power-generation-state signal output terminal.

The judging result by the voltage judging circuit 14 may be reset periodically. For example, the judging result by the voltage judging circuit 14 may be reset each time a time-up signal is outputted from a timer circuit configured to start at a time when the output signal of the voltage judging circuit 14 changes from low level to high level, that is, when the power generating operation stop state starts, and to output the time-up signal after an elapse of a certain time. This makes it possible to restart the power generating operation after the power generation operation is stopped by malfunction.

Second Embodiment

A vehicle-generator output voltage control apparatus according to a second embodiment of the invention is characterized in that it has an abnormality detecting circuit to invalidate the power generation stop command when there occurs abnormality in the FR-terminal.

Figure 2:
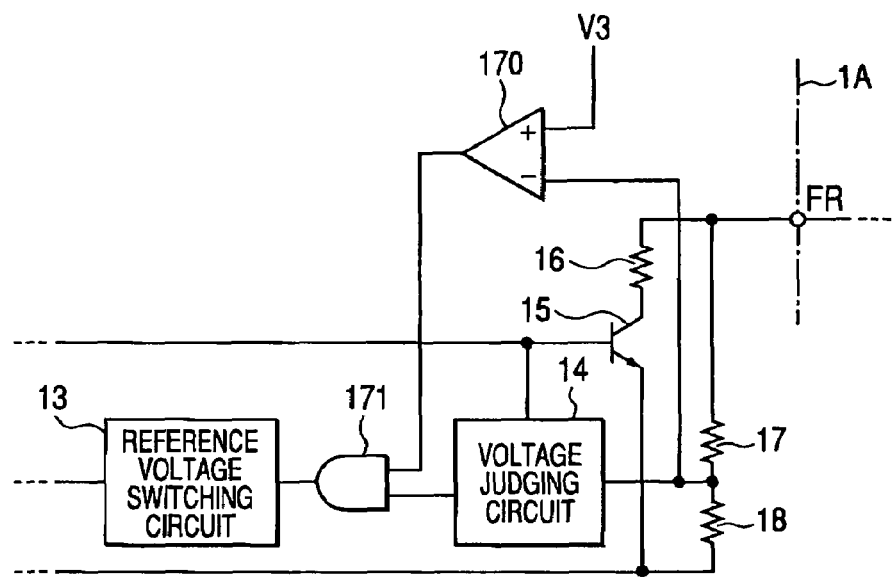
FIG. 2 is a diagram showing a different part between the vehicle-generator output voltage control apparatus according to the first embodiment of the invention and a vehicle-generator output voltage control apparatus according to a second embodiment of the invention.

FIG. 2 is a diagram showing a different part between the vehicle generator-output voltage control apparatus 1 of the first embodiment and the vehicle-generator output voltage control apparatus 1A of the second embodiment.

The vehicle-generator output voltage control apparatus 1A of the second embodiment is additionally provided with the abnormality detecting circuit constituted by a voltage comparator 170 receiving the FR-terminal voltage divided down by the voltage dividing circuit constituted by the resistors 17, 18 at its negative input terminal and receiving a reference voltage V3 at its positive input terminal, and an AND circuit 171 provided between the voltage judging circuit 14 and the reference voltage switching circuit 13. The value of the reference voltage V3 is set higher than a maximum value of the voltage appearing at the FR-terminal when there is no abnormality in a signal wire connected between the FR-terminal and the external control device 7. If there occurs a short circuit between the FR-terminal or the signal wire and the power supply line, the voltage appearing at the FR-terminal becomes higher than the reference voltage V3, and accordingly an output signal of the voltage comparator 170 applied to one input terminal of the AND circuit 171 becomes low level. At this time, the AND circuit 171 blocks the signal indicative of the judging result by the voltage judging circuit 14, and supplies a low-level signal to the reference voltage switching circuit 13. As a consequence, the reference voltage switching circuit 13 generates the first reference voltage V1 to perform the normal power generating operation.

Hence, it becomes possible to prevent the power generating operation stop state erroneously occurred due to abnormality such as a short circuit between the FR-terminal or the signal wire and the power supply line from lasting long.

Third Embodiment

A vehicle-generator output voltage control apparatus according to a third embodiment of the invention is characterized in that it has, in addition to the abnormality detecting circuit, a low-voltage detecting circuit to invalidate the power generation stop command when the output voltage of the vehicle generator 2 or the terminal voltage of the battery 4 drops below a certain value.

Figure 3:
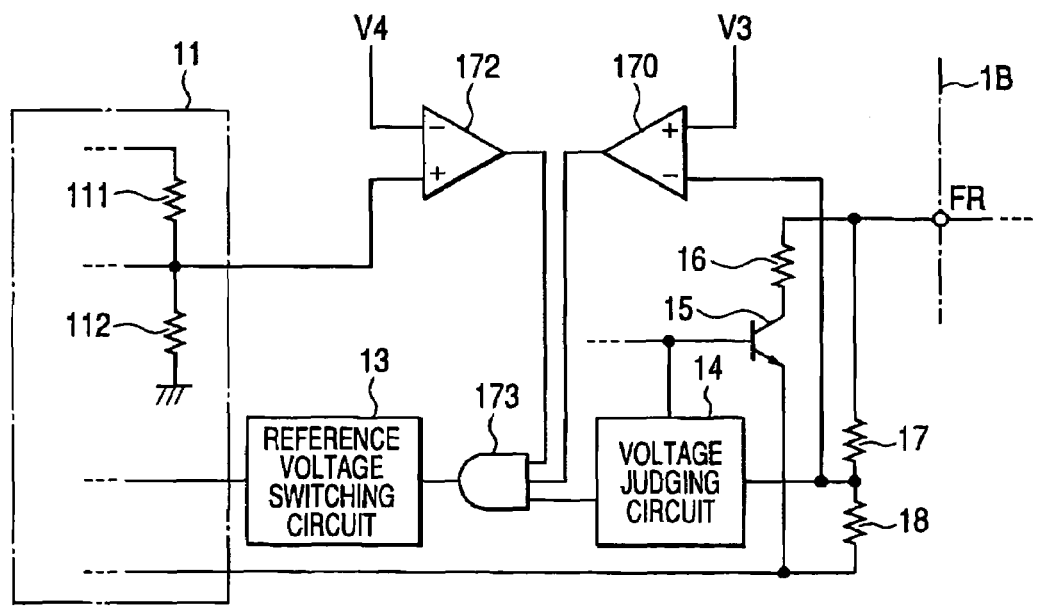
FIG. 3 is a diagram showing a different part between the vehicle-generator output voltage control apparatus according to the second embodiment and a vehicle-generator

FIG. 3 is a diagram showing a different part between the vehicle-generator output voltage control apparatus 1A of the second embodiment and the vehicle-generator output voltage control apparatus 1B of the third embodiment.

The vehicle-generator output voltage control apparatus 1B of the third embodiment is additionally provided with the low-voltage detecting circuit constituted by a voltage comparator 172 having a positive input terminal connected to the node between the resistor 111 and the resistor 112 of the voltage control circuit 11 and a negative input terminal applied with a reference voltage V4, and a three-input AND circuit 173 replacing the two-input AND circuit 171. Normally, the output voltage of the vehicle generator 2 or the terminal voltage of the battery 4 is controlled at a constant value irrespective of the value of the electrical load. However, the output voltage of the vehicle generator 2 or the terminal voltage of the battery 4 may drop temporarily due to shortage of the power generation capacity when a large electrical load is thrown in, or the value of the electrical load increases rapidly.

In the third embodiment, if the output voltage of the vehicle generator 2 or the terminal voltage of the battery 4 drops, and the voltage outputted from the voltage dividing circuit constituted by the resistors 111, 112 becomes lower than the reference voltage V4, an output signal of the voltage comparator 172 applied to one of the three input terminals of the AND circuit 173 becomes low level. In consequence, the AND circuit 173 blocks the signal indicative of the judging result by the voltage judging circuit 14, and supplies a low-level signal to the reference voltage switching circuit 13. As a result, the reference voltage switching circuit 13 generates the reference voltage V1 to perform the normal power generating operation.

With the third embodiment of the invention, it becomes possible to prevent the power generating operation from being stopped due to shortage of the power generation capacity when a large electrical load is thrown in, or the value of the electrical load increases rapidly, and accordingly to prevent the electrical loads from stopping their operations or malfunctioning due to lowering of their operating voltages.

The above explained preferred embodiments are exemplary of the invention of the present application which is described solely by the claims appended below. It should be understood that modifications of the preferred embodiments may be made as would occur to one of skill in the art.

What is claimed is:

1. A vehicle-generator output voltage control apparatus comprising:
    a voltage control circuit regulating an output voltage of a vehicle generator by controlling a field current flowing into a field winding of said vehicle generator by controlling a conduction state of a switching transistor series-connected to said field winding;
    a power-generation-state signal output circuit outputting a power-generation-state signal through a transmitting/receiving terminal by changing a voltage at said transmitting/receiving terminal in accordance with conduction state of said switching transistor; and
    a power generation stop circuit stopping power generating operation of said vehicle generator by causing said voltage control circuit to turn off said switching transistor upon detecting a change of said voltage at said transmitting/receiving terminal caused by a power generation stop signal transmitted from an external control device and received at said transmitting/receiving terminal.

2. The vehicle-generator output voltage control apparatus according to claim 1, wherein said power generation stop circuit includes a voltage detecting circuit configured to detect said change of said voltage at said transmitting/receiving terminal by comparing said voltage at said transmitting/receiving terminal with a predetermined judging voltage, and to transmit a result of said detection to said voltage control circuit.

3. The vehicle-generator output voltage control apparatus according to claim 2, wherein said power generation stop circuit resets result of said detection periodically.

4. The vehicle-generator output voltage control apparatus according to claim 1, wherein said power-generation-state signal output circuit has a resistor which is connected to said transmitting/receiving terminal at one end thereof, and is configured to change a voltage of the other end of said resistor to thereby output said power-generation-state signal through said transmitting/receiving terminal.

5. The vehicle-generator output voltage control apparatus according to claim 4, wherein said power-generation-state signal output circuit has a transistor connected between said other end of said resistor and a ground at a collector and an emitter thereof, and operating in synchronization with said switching transistor.

6. The vehicle-generator output voltage control apparatus according to claim 1, further comprising an abnormality detecting circuit detecting abnormality in said transmitting/receiving terminal, and invalidating said power generation stop signal upon detecting abnormality in said transmitting/receiving terminal.

7. The vehicle-generator output voltage control apparatus according to claim 6, further comprising a low-voltage detecting circuit detecting a drop below a certain value in said output voltage of said vehicle generator or a terminal voltage of an external battery charged by said vehicle generator, and invalidating said power generation stop signal upon detecting said drop.

* * * * *